Patented Nov. 21, 1939

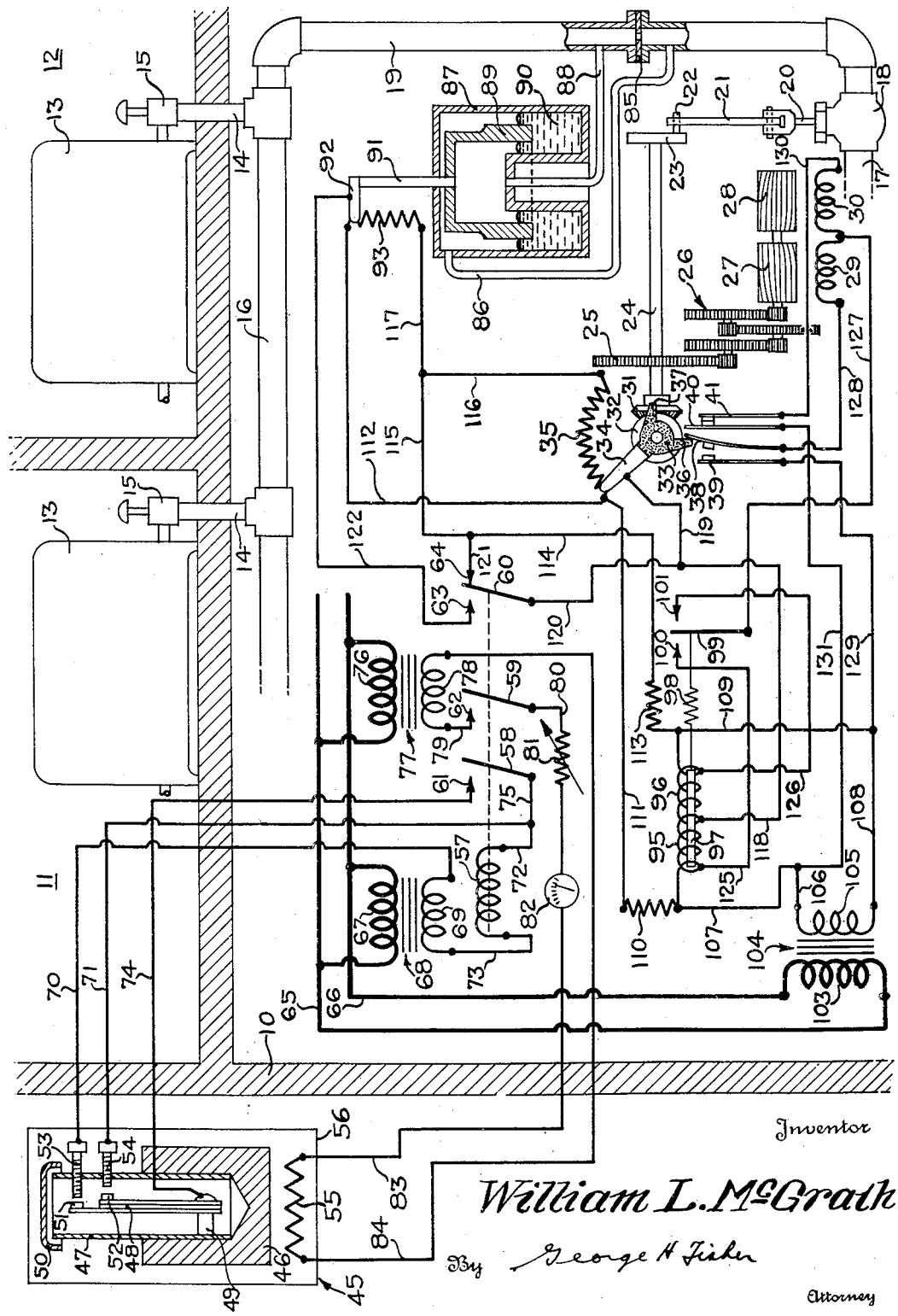

2,181,061

UNITED STATES PATENT OFFICE 2,181,061

TEMPERATURE CONTROL SYSTEM

William L. McGrath, Minneapolis, Minn., assignor to Minneapolis-Honeywell Regulator Company, Minneapolis, Minn., a corporation of Delaware Application September 5, 1935, Serial No. 39,264

6 Claims. (Cl. 236—91)

This invention relates to temperature control systems of the type disclosed in United States Patent No. 2,065,835 granted to Daniel G. Taylor on December 29, 1936.

The system disclosed in the above referred to Taylor application comprises an outdoor controller responsive to outdoor atmospheric conditions, including temperature, wind and solar radiation for controlling the temperature within the building. Heating means are provided in the building for supplying heat to the building, and heating means are also provided in the outdoor controller for supplying heat to the outdoor controller. The two heating means are proportioned according to the heat losses from the building and from the outdoor controller. A thermostatic device is provided in the outdoor controller for responding to the temperature within the outdoor controller, and when this thermostatic device calls for heat both of the heating means are energized simultaneously to deliver heat to the building and to the outdoor controller. Due to the proportional relationship of the heating means with the heat losses of the building and the outdoor controller, a definite temperature relation is maintained within the building and the outdoor controller so that by responding to the temperature of the outdoor controller, the thermostatic device maintains a substantially constant or normal temperature within the building.

Such a system may be readily adapted to a building heating system having a valve for admitting heating fluid to the radiation surfaces within the building. The heating fluid may be steam which may be supplied from a constantly energized boiler or a central power plant. The valve may be opened simultaneously with the energization of the outdoor controller heater upon a call for heat by the outdoor controller. However, it has been found that the rate of flow of steam through such a valve is not constant but varies. These variations in rate of flow may be attributed to changes in steam supply pressures, to changes in rate of condensation in the heating system which results in varying outlet pressures at the valve, to the condition of the heating system just after the valve is opened depending upon whether the system is full of steam or whether it contains a vacuum caused by rapid condensation of the steam supplied to the frequency of operation of the valve, to the length of time which the valve is opened and to other causes. Therefore, a valve which controls the supply of steam to a heating system does not necessarily admit twice as much steam when the valve is opened, say twenty minutes, than when the valve is opened only ten minutes.

The successful operation of such a heating system depends upon the ability to maintain the ratio of the heat supplied to the building and to the outdoor controller constant regardless of the conditions which tend to vary the rate of the flow of heating fluid to the radiation surfaces within the building.

It is therefore an object of this invention to provide means whereby heat may be supplied to a building or space at a constant rate upon a call for heat.

It is another object of this invention to provide a heating system for a building or space wherein the heating system is operated in accordance with outdoor atmospheric conditions and wherein the rate of heat supply to the building or space is maintained constant.

Still another object is to provide a control system for a building heating system having a control valve, wherein the control valve is opened in response to a call for heat and wherein the amount of valve opening may be varied to maintain a constant rate of flow of heating fluid to the heat exchangers within the building.

A further object is to provide a control system for a building heating system wherein the control system comprises an outdoor controller subject to the same atmospheric conditions as the building including temperature, wind and solar radiation, the controller including a heating means and a thermostatic means which operates the heating means and the building heating system along with means whereby the rate at which heat is supplied to the building may be maintained constant during the periods when there is a call for heat.

Other objects and advantages will become apparent to those skilled in the art upon reference to the accompanying specification, claims and drawing, in which drawing is diagrammatically illustrated the preferred form of my invention.

My control system is shown as applied to a building having an outside wall 10 and a plurality of spaces or rooms to be heated, 11 and 12. Located in the spaces or rooms are radiators, or heat exchangers 13 which receive a supply of heating fluid, such as steam, from risers 14, under the control of manually operated valves 15. The risers 14 connect into a header 16. A pipe 17 emanating from some source of heating fluid such as a constantly energized boiler, or a central heating plant, supplies heating fluid to a pipe 19 under the control of a valve 18, the pipe 19 being connected to the header 16. The arrangement is such that when the valve 18 is open heating fluid is supplied through the pipe 19, the header 16 and the risers 14 to the radiators 13 to heat the rooms 11 and 12. When the valve 18 is closed, the further supply of heating fluid to the radiators 13 is prevented.

The valve 18 is operated by a valve stem 20 which is connected to one end of a pitman 21. The other end of the pitman 21 is connected to a crank pin 22 carried by a crank disc 23, mounted on a shaft 24. Shaft 24 is operated by a proportioning motor and may take the form of the motor shown and described in application Serial No. 673,236, filed by Lewis L. Cunningham on May 27, 1933.

For purposes of illustration in this application, I have shown the proportioning motor to comprise a gear 25 mounted on the shaft 24 which is driven through a reduction gear train 26 by motor rotors 27 and 28. The motor rotors 27 and 28 are operated by field windings 29 and 30, respectively, the arrangement being such that when the field winding 29 is energized the valve 18 is moved to a closed position, and when the field winding 30 is energized the valve 18 is moved to an open position. The shaft 24 may carry also a bevelled gear 31 meshing with another bevelled gear 32 which carries an abutment member 33. The abutment member 33 is provided with a slider 34 which is adapted to slide across a balancing potentiometer coil 35. The abutment member 33 also carries spaced fingers 36 and 37. The finger 36 is adapted at one extreme position of the abutment member 33 to break contact between contacts 38 and 39. Likewise, the finger 37 is adapted to break contact between contacts 40 and 41 at the other extreme position of the abutment member 33. The contacts 38, 39, 40 and 41, therefore, form limit switches.

Located outside of the building so as to be subject to the same atmospheric conditions as the building, including temperature, wind and solar radiation, is an outdoor controller 45. This outdoor controller 45 comprises a metallic block 46 which is hollowed out to receive a container 47. Located in the container 47 is a bimetallic element 48 mounted on a post 49. The container 47 is closed by a cover 50 so that the bimetallic element will not be directly affected by the outdoor atmospheric conditions but will respond directly to the temperature of the block 46. The bimetallic element 48 carries contacts 51 and 52 which are adapted to sequentially engage adjustable contacts 53 and 54 upon a decrease in block temperature. The block 46 is cooled by outdoor atmospheric conditions and heated by means of a heater 55 located in close proximity with the block 46. The elements comprising the outdoor controller 45 may be enclosed within a casing 56 to prevent deterioration of the same by the weather conditions.

A relay coil 57 is adapted to operate switch arms 58, 59 and 60 with respect to contacts 61, 62, 63 and 64. Upon energization of the relay coil 57, the switch arms 58, 59 and 60 are moved into engagement with the contacts 61, 62 and 63, respectively, and upon deenergization of the relay coil 57, the switch arms 58, 59 and 60 are moved out of engagement with the contacts 61, 62 and 63, and the switch arm 60 is moved into engagement with the contact 64.

Line wires leading from some source of power, not shown, are designated at 65 and 66. A primary 67 of a step-down transformer 68, having a secondary 69 is connected across the line wires 65 and 66. One end of the secondary 69 is connected by a wire 70 to the adjustable contact 53 of the outdoor controller 45. The other adjustable contact 54 is connected by wires 71 and 72 to one end of the relay coil 57. The other end of the relay coil 57 is connected by a wire 73 to the other end of the secondary 69. The bimetallic element 48 of the outdoor controller 45 is connected by a wire 74 to the contact 61, and the switch arm 58 which cooperates with the contact 61 is connected by a wire 75 to the junction of wires 71 and 72.

A primary 76 of a step-down transformer 77, having a secondary 78, is also connected across the line wires 65 and 66. One end of the secondary 78 is connected by a wire 79 to the contact 62. Switch arm 59, which cooperates with the contact 62, is connected by a wire 80, a manually operated variable resistance 81, an ammeter 82, and a wire 83 to one end of the heater 55. The other end of the heater 55 is connected by a wire 84 to the other end of the secondary 78. The variable resistance 81 and the ammeter 82 provide a means for adjusting and visually indicating the amount of heat supplied to the block 46 by the heater 55.

Upon a decrease in temperature of the block 46, the contact 51 is moved into engagement with the contact 53, and upon a further decrease in block temperature, the contact 52 is moved into engagement with the contact 54. This causes completion of a circuit from the secondary 69, through wire 70, contacts 53, 51, 52 and 54, wires 71 and 72, relay coil 57 and wire 73 back to the secondary 69. Completion of this circuit causes energization of the relay coil 57 to move the switch arms 58, 59 and 60 into engagement with the contacts 61, 62 and 63. Movement of the switch arm 58 into engagement with the contact 61 completes a maintaining circuit from the secondary 69, through wires 70, contacts 53 and 51, bimetallic element 48, wire 74, contact 61, switch arm 58, wires 75 and 72, relay coil 57 and wire 73 back to the secondary 69. This maintaining circuit maintains the relay coil 57 energized until contact between the contacts 51 and 53 is broken.

Movement of the switch arm 59 into engagement with the contact 62 completes a circuit from the secondary 78 through wire 79, contact 62, switch arm 59, wire 80, variable resistance 81, ammeter 82, wire 83, heater 55 and wire 84, back to the secondary 78. This causes energization of the heater 55 to increase the temperature of the block 46. When the temperature of the block 46 has increased to a predetermined value so as to break contact between the contacts 51 and 53, the relay coil 57 is deenergized and the switch arms 58, 59 and 60 are moved out of engagement with the contacts 61, 62 and 63, and the switch arm 60 is moved into engagement with the contact 64. This causes deenergization of the heater 55 to prevent the further supply of heat to the outdoor controller until such time as the temperature of the block 46 shall so decrease to move the contacts 51 and 52 into engagement with the contacts 53 and 54.

Located in the pipe 19 which supplies heating fluid, such as steam, to the header 16, is an orifice plate 85. The pipe 86 connects into the pipe 19 on the high pressure side of the orifice plate 85 and leads to the upper end of a pressure chamber 87. A pipe 88 extends from the pipe 19 on the low pressure side of the orifice plate 85 to the lower portion of the pressure chamber 87. Located in the pressure chamber 87 is an inverted bell 89 which is adapted to float upon and be sealed by a pool of mercury designated at 90. The float 89 and the mercury seal, therefore, divide pressure chamber 87 into the high pressure chamber located above the bell 89, and a low pressure chamber located within the bell 89. The bell 89 operates a rod or arm 91 which carries a slider 92 which is adapted to slide across a potentiometer coil 93. By reason of the orifice plate 85, the pressure chamber 87 and the connections between the same, the slider 92 is moved upwardly or downwardly in response to changes in the rate of flow of the heating fluid through the pipe 19. The arrangement is such that upon an increase in the rate of flow within the pipe 19, the inverted bell 89, and consequently the slider 92, are moved downwardly, and upon a decrease in the rate of flow through the pipe 19, the bell 89, and consequently the slider 92 are moved upwardly. The potentiometer coil may be made adjustable longitudinally so that it may be moved with respect to the slider 92 whereby the controlling action of the flow controller may be adjusted.

Oppositely acting coils are designated at 95 and 96, and these coils control the operation of an armature or core 97 which is connected by means of a spring 98 to a pivoted switch arm 99. The switch arm 99 cooperates with the spaced contacts 100 and 101. When the coil 95 is energized more than the coil 96, the switch arm 99 is moved into engagement with the contact 100, and when the coil 96 is energized more than the coil 95, the switch arm 99 is moved into engagement with the contact 101. When the coils 95 and 96 are equally energized, the switch arm 99 assumes a position midway between the contacts 100 and 101, as shown in the drawing.

Also connected across the line wires 65 and 66 is a primary 103 of a step-down transformer 104, having a secondary 105. One end of the secondary 105 is connected by wires 106 and 107 to one end of the coil 95, and likewise, the other end of the secondary 105 is connected by wires 108 and 109 to one end of the coil 96. The other ends of the coils 95 and 96 are connected together. The junction of wire 107 and the coil 95 is connected by a protective resistance 110 and wires 111 and 112 to the left-hand end of the balancing potentiometer coil 35 and to the upper end of the potentiometer coil 93. In a like manner, the junction of wire 109 and the coil 96 is connected by a protective resistance 113 and wires 114, 115, 116 and 117 to the right-hand end of the balancing potentiometer coil 35 and the lower end of the potentiometer coil 93. The junction of the coils 95 and 96 is connected by wires 118, 119 and 120 to the slider 34 which cooperates with the balancing potentiometer coil 35 and the switch arm 60. The contact 64 is connected by a wire 121 to the junction of the wires 114 and 115 and the contact 63 is connected by a wire 122 to the slider 92 associated with the potentiometer coil 93. From the above wiring connections, it is seen that when the switch arm 60 is moved into engagement with the contact 63, the upper end of the secondary 105, the left-hand ends of the coil 95 and the balancing potentiometer 35, and the upper end of the potentiometer coil 93 are connected together, and that the lower end of the secondary 105, the right-hand ends of the coil 96 and the balancing potentiometer coil 35, and the lower end of the potentiometer coil 93 are connected together. Likewise, the junction of the coils 95 and 96 and the sliders 34 and 92 are connected together. It can therefore be said that the secondary 105, the coils 95 and 96, the balancing potentiometer coil 35 and the potentiometer coil 93 are connected in parallel.

The contact 100 associated with the switch arm 99 is connected by a wire 125 to a small number of turns of the coil 95 and the contact 101 is connected by a wire 126 to a small number of turns of the coil 96. The switch arm 99 is connected by a wire 127 to the adjacent ends of the field windings 29 and 30. The other end of the field winding 29 is connected by a wire 128 to the limit switch contact 38, and the other end of the field winding 30 is connected by a wire 130 to the contact 41 of the other limit switch. The contact 39 is connected by a wire 129 with the junction of wires 108 and 109, and the contact 40 is connected by a wire 131 to the junction of wires 106 and 107.

Assume the parts in the position shown in the drawing, the outdoor controller 45 is satisfied and, consequently, the relay coil 57 is deenergized. The valve 18 is in a closed position preventing the flow of heating fluid through the pipe 19 and, consequently, the slider 92 is in the extreme upper position. Upon a decrease in block temperature so as to cause energization of the relay coil 57, the switch arms 59 and 60 are moved into engagement with the contacts 62 and 63. Movement of the switch arm 59 into engagement with the contact 62 causes heating of the outdoor controller 45, the movement of the switch arm 60 into engagement with the contact 63 places the fluid flow regulator in command of the proportioning motor. With the slider 92 in the upper position shown as a result of no flow of heating fluid through the pipe 19, a circuit is completed from the junction of the coils 95 and 96 through wires 118 and 120, switch arm 60, contact 63, wire 122, slider 92, potentiometer coil 93, wires 112 and 111, and protective resistance 110 to the other end of the coil 95. This circuit causes short-circuiting of the coil 95 to decrease the energization thereof, and by reason of the parallel relationship pointed out above to increase the energization of the coil 96. This unequal energization of the coils 95 and 96 causes right-hand movement of the switch arm 99 into engagement with the contact 101. This causes completion of a circuit from the secondary 105 through wires 108 and 109, a small number of turns of the coil 96, wire 126, contact 101, switch arm 99, wire 127, field winding 30, wire 130, contacts 41 and 40, and wires 131 and 106, back to the secondary 105. Completion of this circuit causes energization of the field winding 30 to move the valve 18 towards an open position.

Movement of the valve 18 towards an open position causes right-hand movement of the slider 34 with respect to the balancing potentiometer coil 35, and this right-hand movement causes short circuiting or shunting of the coil 96 to decrease the energization of the coil 96 and increase the energization of coil 95, it being remembered that the coil 96 was energized more than the coil 95 by reason of the slider 92 being located adjacent the upper end of the potentiometer coil 93. When the slider 34 has been moved sufficiently far to the right with respect to the balancing potentiometer coil 35 so as to rebalance the coils 95 and 96, the switch arm 99 is moved out of engagement with the contact 101 to the mid position shown in the drawing. This causes deenergization of the field winding 30 to prevent further opening movement of the valve 18. Since the slider 92 is located at the extreme upper position with respect to the potentiometer coil 93, the slider 34 will have to move to the extreme right-hand position with respect to the balancing potentiometer coil 35 in order to rebalance the coils 95 and 96. This necessarily causes complete opening of the valve 18.

When the valve 18 has thus been opened, the rate of flow of fluid through the pipe 19 increases, and as this rate of flow of fluid through the pipe 19 increases, the slider 92 is moved downwardly with respect to the potentiometer coil 93. This downward movement of the slider 92 causes short-circuiting of the coil 96 to decrease the energization thereof, and increase the energization of the coil 95. This causes movement of the switch arm 99 into engagement with the contact 100 to complete a circuit from the secondary 105, through wires 106 and 107, a small number of turns of the coil 95, wire 125, contact 100, switch arm 99, wire 127, field winding 29, wire 128, contacts 38 and 39, and wires 129 and 108 back to the secondary 105. Completion of this circuit causes energization of the field winding 29 to move the valve 18 towards a closed position.

Movement of the valve 18 towards a closed position causes left-hand movement of the slider 34 with respect to the balancing potentiometer coil 35 to shunt or short-circuit the coil 95 to decrease the energization thereof, and increase the energization of the coil 96, it being remembered that the coil 95 was energized more than the coil 96 by the downward movement of the slider 92 with respect to its potentiometer coil 93. When the valve 18 has been moved sufficiently far towards a closed position so as to rebalance the coils 95 and 96, the switch arm 99 is moved out of engagement with the contact 100 to break the circuit through the field winding 29 to stop further closing movement of the valve 18. Therefore, whatever position the slider 92 may be caused to take with respect to the potentiometer coil 93, the valve 18 will assume a like position and in this manner the rate of flow of heating fluid through the pipe 19 is maintained constant whenever the switch arm 60 is moved into engagement with the contact 63.

The above circuits for energizing the field windings 29 and 30 include a small number of turns of the coils 95 and 96 to forcibly hold the switch arm 99 in engagement with either contact 100 or 101, whereby relay chatter is entirely prevented.

When the outdoor controller 45 has become satisfied, so as to deenergize the relay coil 57, the switch arms 58, 59 and 60 are moved out of engagement with the contacts 61, 62 and 63, and the switch arm 60 is moved into engagement with switch arm 64. Movement of the switch arm 59 out of engagement with the contact 62 prevents the further supply of heat to the block 46 of the outdoor controller 45. Movement of the switch arm 60 into engagement with the contact 64 causes substantially complete short-circuiting of the coil 96 to decrease the energization thereof and increase the energization of the coil 95. This causes movement of the switch arm 99 into engagement with the contact 100 to energize the field winding 29 to move the valve 18 towards a closed position. Since the coil 96 is substantially completely short-circuited in this manner, the slider 34 must move to the extreme right-hand end of the balancing potentiometer coil 35 in order to rebalance the coils 95 and 96 and, therefore, the valve 18 is moved to a full closed position to prevent the further supply of heating fluid through radiators or heat exchangers 13.

The fluid flow regulator and the variable resistance 81 are so adjusted that the amount of heat delivered to the building and to the outdoor controller 45 is proportional to the heat losses from the building and from the outdoor controller 45. By reason of the fluid flow controller positioning the valve 18 to maintain a constant flow of heating fluid to the radiators, and by reason of the fact that the amount of heat delivered to the outdoor controller 45 is maintained constant, the exact amounts of heat delivered to the outdoor controller and to the building are accurately determined to maintain the above referred to proportion constant regardless of whether the valve 18 is open for a short period of time or for a long period of time. As pointed out above, due to condensation rates, a valve opened a given amount for a period of say twenty minutes, will not necessarily deliver twice as much heating fluid to the radiators as a ten minute opening of the valve. However, by reason of my construction, the rate of flow to the radiators 13 during the periods that the valve is open is maintained constant regardless of the length of the period during which the valve 18 is maintained open, or the frequency of its openings, so that the exact and correct proportionate amounts of heat are delivered to the building and to the outdoor controller to accurately maintain the above referred to proportion, whereby the building temperature is maintained constant.

Although I have disclosed one form of my invention, it is apparent that other forms thereof may become apparent to those skilled in the art and consequently this invention is to be limited only by the scope of the appended claims and the prior art.

I claim as my invention:

1. In a heating system for a building, the combination of valve means for controlling the supply of heating fluid to the building, flow responsive means for regulating said valve means to maintain the rate of flow of the heating fluid substantially constant when the valve means is opened regardless of normal conditions on the outlet side of said valve, an outdoor controller subject to the same atmospheric conditions as the building and including heating means and thermostatic means, and means including said thermostatic means operative upon the temperature to which said thermostatic means is responsive falling below a predetermined value to cause energization of said heating means and control of said valve means by said flow responsive means independently of atmospheric conditions and operative upon the temperature to which said thermostatic means is responsive rising above a predetermined value to cause deenergization of said heating means and movement of said valve means to a minimum flow position.

2. In a heating system for a building, the combination of valve means for controlling the supply of heating fluid to the building, flow responsive means for regulating said valve means to maintain the rate of flow of the heating fluid substantially constant when the valve means is opened regardless of normal conditions on the outlet side of said valve, an outdoor controller subject to the same atmospheric conditions as the building and including heating means and thermostatic means, means including said thermostatic means operative upon the temperature to which said thermostatic means is responsive falling below a predetermined value to place the valve means under the control of the flow responsive means to cause a flow of heating fluid at a uniform rate and operative upon the temperature to which said thermostatic means is responsive rising above a predetermined value to cause movement of said valve means to a minimum flow position, and means for causing energization of said heating means simultaneously with the movement of the valve means away from its minimum flow position and for causing deenergization of the heating means upon movement of the valve to its minimum flow position.

3. In a heating system for a building, the combination of valve means for controlling the supply of heating fluid to the building, flow responsive means for regulating said valve means to maintain the rate of flow of the heating fluid substantially constant when the valve means is opened regardless of normal conditions on the outlet side of said valve, an outdoor controller subject to the same atmospheric conditions as the building and including heating means and thermostatic means, means including said thermostatic means operative upon the temperature to which said thermostatic means is responsive falling below a predetermined value to place the valve means under the control of the flow responsive means to cause a flow of heating fluid at a uniform rate and operative upon the temperature to which said thermostatic means is responsive rising above a predetermined value to cause movement of said valve means to a minimum flow position, and means for causing energization of said heating means as long as said valve means is out of its minimum flow position and is under the control of the flow responsive means, and interrupting energization thereof while the valve means is in its minimum flow position.

4. In a temperature control system for an enclosure, the combination of, valve means for controlling the supply of temperature changing fluid to the enclosure, electric motor means for positioning the valve means, first current controlling means operated in response to the rate of flow of the temperature changing fluid, means including circuit connections between the electric motor means and the first current controlling means for controlling the operation of the electric motor means and hence the valve means in accordance with the rate of flow of the temperature changing fluid to maintain the rate of flow of the temperature changing fluid substantially constant, and second current controlling means operated in response to changes in temperature included in said circuit connections for interrupting the circuit connections between the first current controlling means and the electric motor means to render the first current controlling means inoperative to position the electric motor means and for operating the electric motor means to close the valve means.

5. In a temperature control system for an enclosure, the combination of, valve means for controlling the supply of temperature changing fluid to the enclosure, control means responsive to the rate of flow of the temperature changing fluid, intermittently operated control means including means responsive to atmospheric condition outside of the enclosure, and means controlled by both control means for regulating the valve means intermittently and alternately to interrupt substantially the supply of temperature changing fluid to the enclosure or to supply temperature changing fluid to the enclosure at a substantially uniform rate in a manner to cause the period of time during which the supply of temperature changing fluid is substantially interrupted with respect to the period of time the temperature changing fluid is supplied at a substantially constant rate to vary with changes in outside atmospheric conditions to maintain desired temperature conditions within the enclosure.

6. In a temperature control system for an enclosure, the combination of, valve means for controlling the supply of temperature changing fluid to the enclosure, flow responsive means for regulating the valve means to maintain the rate of flow of the temperature changing fluid substantially constant when it is in control of the valve means, means including means responsive to atmospheric conditions outside of the enclosure for intermittently and alternately causing movement of the valve means to a minimum flow position or placing the valve means under the control of the flow responsive means in a manner to cause the period of time during which the valve means is under the control of the flow responsive means with respect to the period of time the valve means is in the minimum flow position to vary with changes in outside atmospheric conditions to maintain desired temperature conditions within the enclosure.

WILLIAM L. McGRATH.